US008908223B2

(12) United States Patent
Ono et al.

(10) Patent No.: US 8,908,223 B2
(45) Date of Patent: *Dec. 9, 2014

(54) PRINT CONTROL APPARATUS, IMAGE FORMING SYSTEM, AND NON-TRANSITORY COMPUTER-READABLE MEDIUM

(71) Applicant: Fuji Xerox Co., Ltd., Minato-ku, Tokyo (JP)

(72) Inventors: Mitsuoki Ono, Kanagawa (JP); Naoya Takayama, Kanagawa (JP); Takeshi Naminoue, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/019,168

(22) Filed: Sep. 5, 2013

(65) Prior Publication Data

US 2014/0146352 A1    May 29, 2014

(30) Foreign Application Priority Data

Nov. 28, 2012    (JP) ................................. 2012-260398

(51) Int. Cl.
*G06F 3/12* (2006.01)
*G06F 13/00* (2006.01)

(52) U.S. Cl.
CPC .................................. *G06F 3/1274* (2013.01)
USPC .......... 358/1.16; 358/1.15; 358/1.1; 711/100; 710/25; 710/34; 718/101

(58) Field of Classification Search
CPC ............. G06F 5/06; G06F 7/00; G06F 7/026; G06F 3/1296; G06F 3/1208; G06F 3/1274; G06F 3/1263; G06F 9/5038; G06F 11/00; G06F 3/1288; G06F 3/1273; G06F 2003/0697; G06K 15/18; G06K 15/1806; G06K 15/1807; G06K 15/1809; G06K 15/1817; G06K 15/1821; G06K 15/4095; H04N 1/00954
USPC .................. 358/1.1, 1.9, 2.1, 1.11–1.18, 504, 358/400–406, 1.5; 399/82–87, 8–24; 707/687–704; 711/100; 710/25, 34; 718/101
See application file for complete search history.

(56) References Cited

U.S. PATENT DOCUMENTS 8,599,410 B2 * 12/2013 Sugiyama .................... 358/1.15
8,634,087 B1 *  1/2014 Kondo .......................... 358/1.14
(Continued)

FOREIGN PATENT DOCUMENTS

JP    59-83429 A    5/1984
JP    5-236007 A    9/1993
(Continued)

*Primary Examiner* — Chad Dickerson
(74) *Attorney, Agent, or Firm* — Sughrue Mion, PLLC

(57) ABSTRACT

A print control apparatus includes a print management unit, a storage unit, a print control unit, and a checking unit. The print management unit accepts print instructions for output data, and records an order in which the print instructions have been accepted. The storage unit temporarily stores the output data related to the print instructions accepted by the print management unit. The print control unit sequentially acquires the output data from the storage unit, transmits the output data to an image forming apparatus, and records an order in which the output data have been transmitted. The checking unit compares and checks the order in which the print instructions have been accepted, which has been recorded by the print management unit, and the order in which the output data have been transmitted, which has been recorded by the print control unit.

11 Claims, 11 Drawing Sheets

(56) References Cited

U.S. PATENT DOCUMENTS

| | | | |
|---|---|---|---|
| 2001/0043723 A1* | 11/2001 | Kadota et al. | 382/113 |
| 2005/0089013 A1 | 4/2005 | Okagawa et al. | |
| 2007/0008580 A1 | 1/2007 | Tanaka | |
| 2007/0091361 A1* | 4/2007 | Matsugashita | 358/1.15 |
| 2008/0263675 A1* | 10/2008 | McIntyre | 726/28 |
| 2011/0134476 A1* | 6/2011 | Takashima | 358/1.15 |
| 2013/0003115 A1* | 1/2013 | Uchikawa | 358/1.15 |

FOREIGN PATENT DOCUMENTS

| | | | |
|---|---|---|---|
| JP | 6-67925 A | | 3/1994 |
| JP | 6-135013 A | | 5/1994 |
| JP | 7-334334 A | | 12/1995 |
| JP | 11345099 A | * | 12/1999 |
| JP | 2001-167094 A | | 6/2001 |
| JP | 2005-130366 A | | 5/2005 |
| JP | 2005-190193 A | | 7/2005 |
| JP | 2005-251050 A | | 9/2005 |
| JP | 2006085335 A | * | 3/2006 |
| JP | 2007-18306 A | | 1/2007 |
| JP | 2008-119966 A | | 5/2008 |
| JP | 2008-532128 A | | 8/2008 |
| JP | 2011-116135 A | | 6/2011 |
| WO | 2006/089743 A2 | | 8/2006 |

* cited by examiner

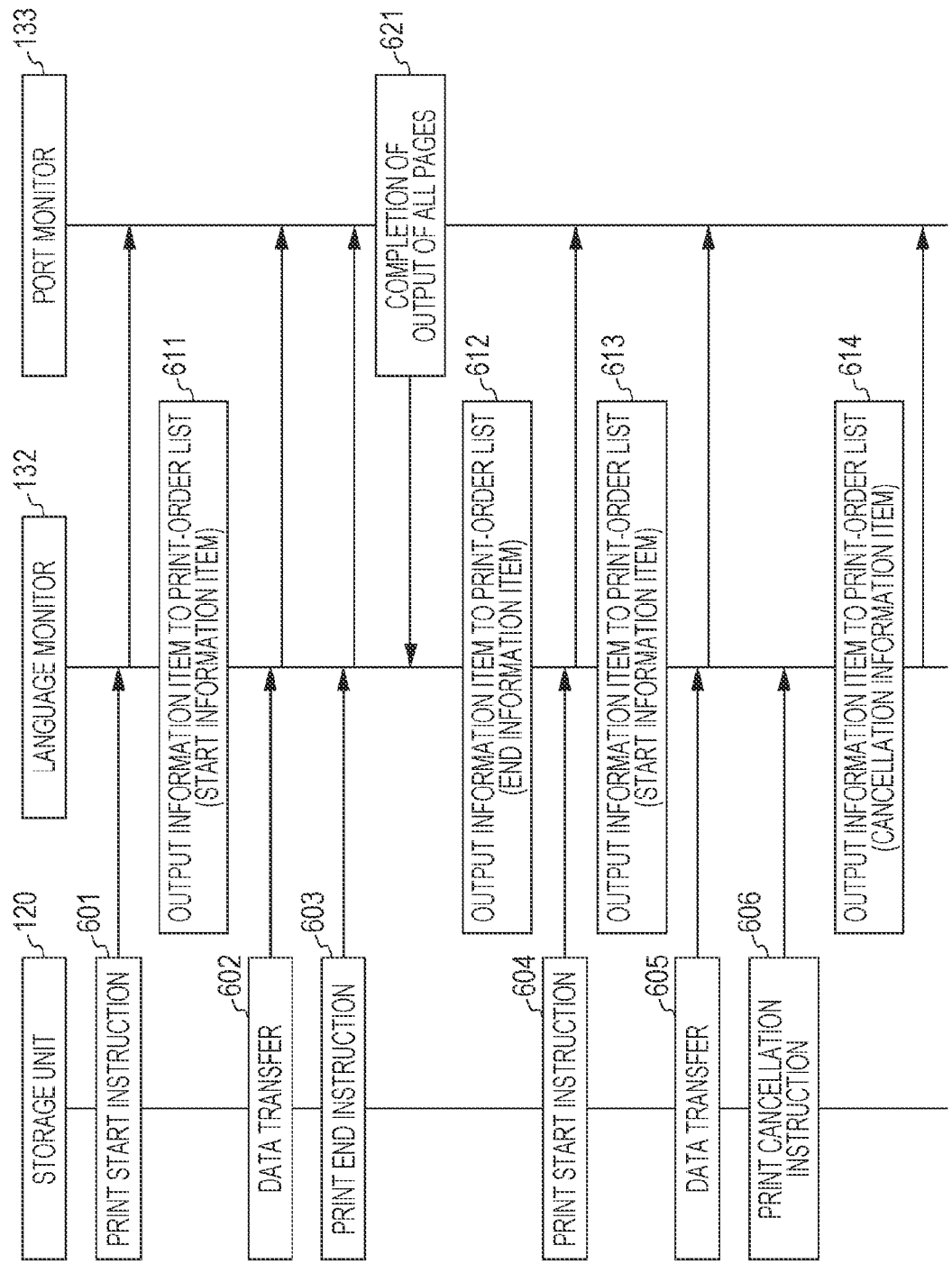

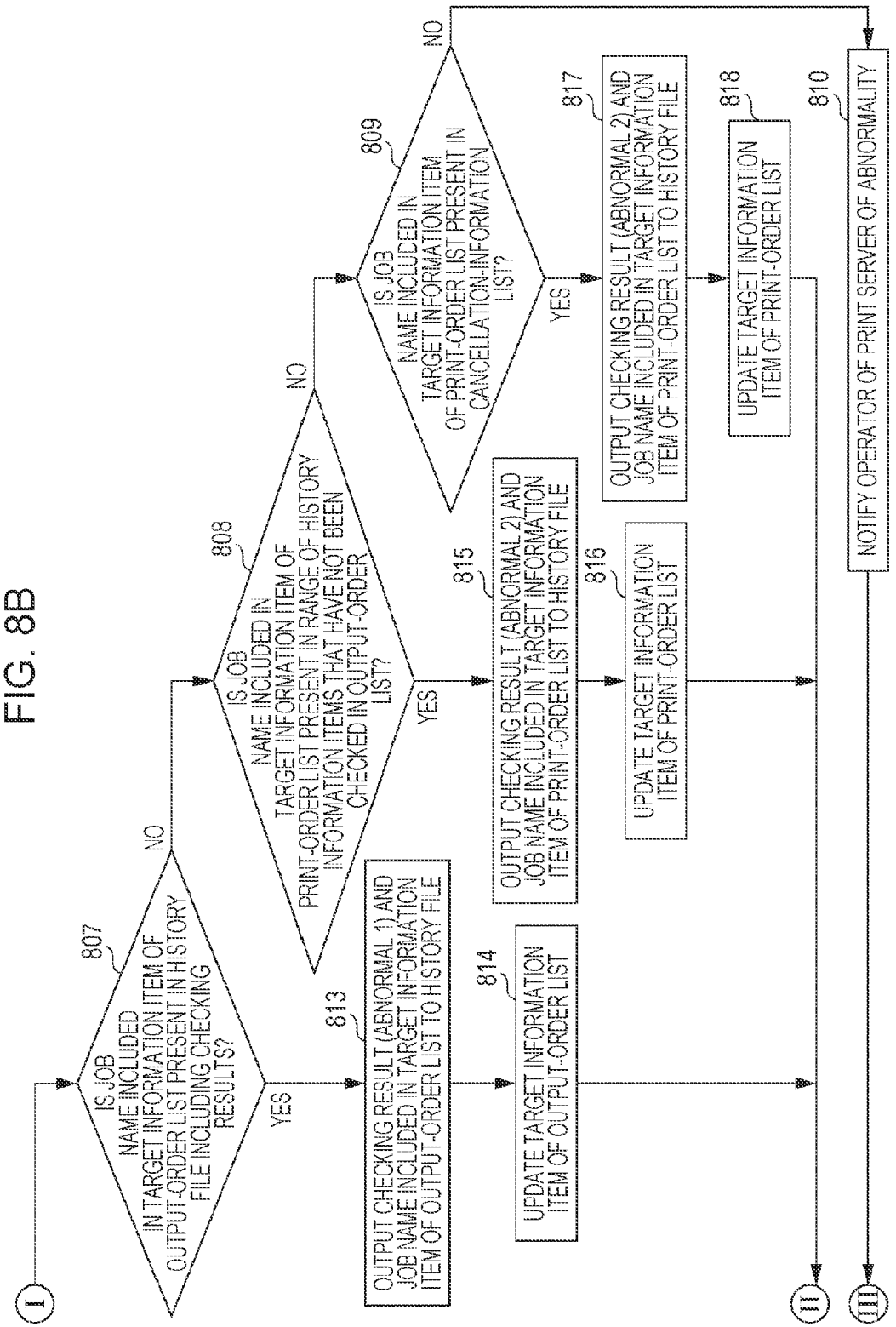

PRINT CONTROL APPARATUS, IMAGE FORMING SYSTEM, AND NON-TRANSITORY COMPUTER-READABLE MEDIUM

CROSS-REFERENCE TO RELATED APPLICATIONS

This application is based on and claims priority under 35 USC 119 from Japanese Patent Application No. 2012-260398 filed Nov. 28, 2012.

BACKGROUND

1. Technical Field

The present invention relates to a print control apparatus, an image forming system, and a non-transitory computer-readable medium.

2. Summary

According to an aspect of the invention, there is provided a print control apparatus including a print management unit, a storage unit, a print control unit, and a checking unit. The print management unit accepts print instructions for output data, and records an order in which the print instructions have been accepted. The storage unit temporarily stores the output data related to the print instructions accepted by the print management unit. The print control unit sequentially acquires the output data from the storage unit, transmits the output data to an image forming apparatus, and records an order in which the output data have been transmitted. The checking unit compares and checks the order in which the print instructions have been accepted, which has been recorded by the print management unit, and the order in which the output data have been transmitted, which has been recorded by the print control unit.

BRIEF DESCRIPTION OF THE DRAWINGS

An exemplary embodiment of the present invention will be described in detail based on the following figures, wherein:

FIG. 6 is a system flow diagram illustrating the procedure of transmission processes performed by a storage unit and a print control unit in the present exemplary embodiment;

FIGS. 8A and 8B are a first part and a second part, respectively, of a flowchart illustrating the procedure of a checking process, which is performed by a checking unit in the present exemplary embodiment, of checking a print order;

DETAILED DESCRIPTION

Hereinafter, an exemplary embodiment of the present invention will be described in detail with reference to the accompanying drawings.

System Configuration

Figure 1:
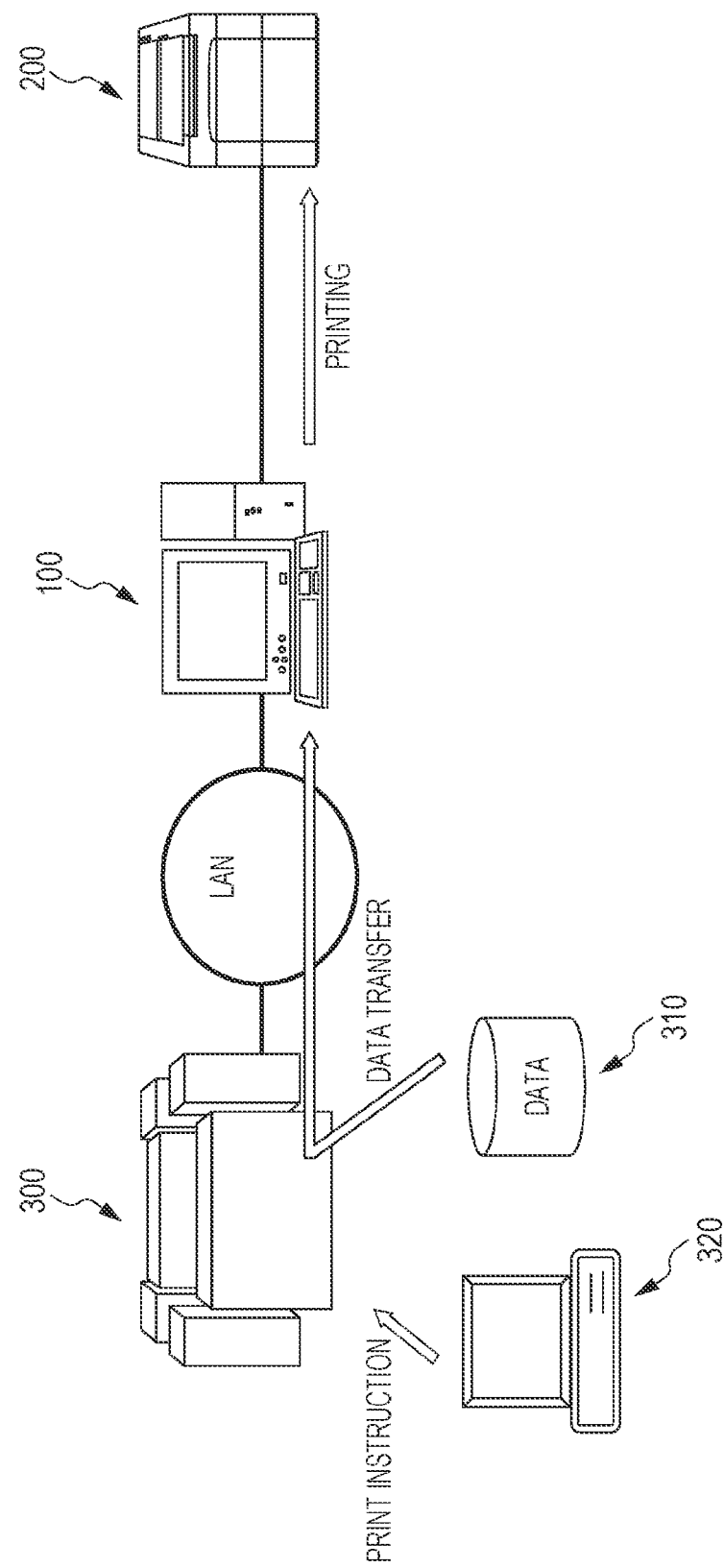
FIG. 1 is a diagram illustrating an example of a configuration of an image forming system according to the present exemplary embodiment.

FIG. 1 is a diagram illustrating an example of a configuration of an image forming system according to the present exemplary embodiment.

The image forming system illustrated in FIG. 1 includes a print server (a print control apparatus) 100 and an image forming apparatus 200. The print server 100 manages print jobs that are processes based on print instructions (output instructions). The image forming apparatus 200 performs print processes (image forming processes) under control of the print server 100. The print server 100 and the image forming apparatus 200 are connected, directly or via a network or the like, to each other so as to transmit/receive data to/from each other. Furthermore, the print server 100 is connected to a host server 300 via a local area network (LAN).

The print server 100 is realized using, for example, a personal computer having a network function. The print server 100 receives print instructions and print data (output data) from the host server 300, and stores (spools) the print data. Then, the print server 100 transmits the stored print data to the image forming apparatus 200, and causes the image forming apparatus 200 to perform print processes. Moreover, the print server 100 according to the present exemplary embodiment checks whether or not print control is performed for the image forming apparatus 200 in a correct order based on the print instructions acquired from the host server 300. A specific functional configuration of the print server 100 will be described below.

The image forming apparatus 200 acquires print data from the print server 100, and forms (prints) and outputs images on recording media, such as sheets of paper, using an image formation material on the basis of the acquired print data. A mechanism for forming an image on a recording medium is not particularly limited in the present exemplary embodiment, and existing various types of schemes, such as a so-called electrophotographic system and an inkjet system, may be used.

The host server 300 is realized using, for example, a computer having a network function, and includes a storage device 310 that holds print data. The host server 300 accepts print instructions, reads print targets (print data) specified by the print instructions from the storage device 310, and transmits the print targets to the print server 100. The print instructions are input from, for example, a terminal apparatus 320 that is connected to the host server 300. The terminal apparatus 320 is realized using, for example, a personal computer having an input device such as a keyboard.

Functional Configuration of Print Server

Figure 2:
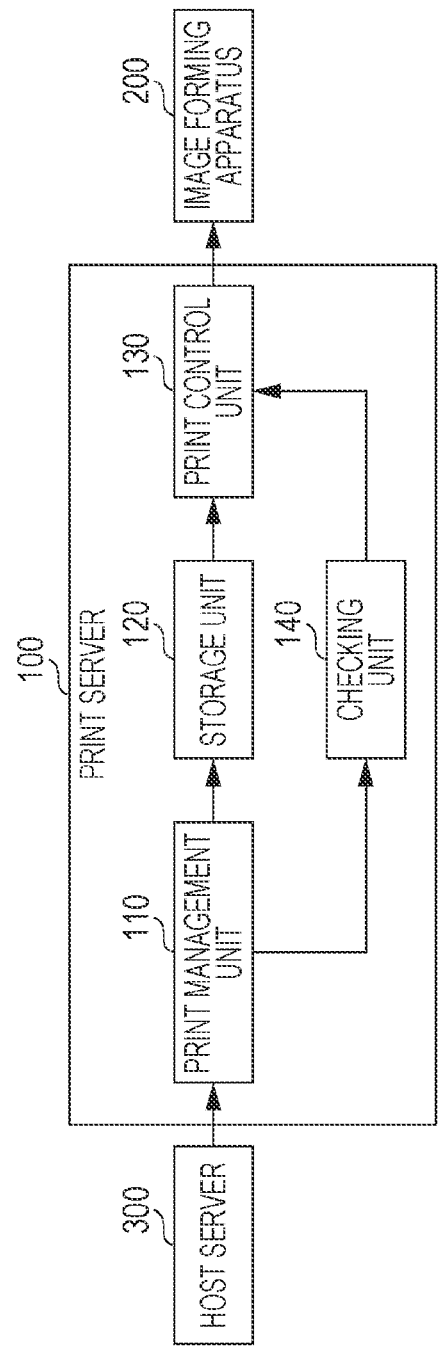
FIG. 2 is a diagram illustrating an example of a functional configuration of a print server according to the present exemplary embodiment.

FIG. 2 is a diagram illustrating an example of a functional configuration of the print server 100.

As illustrated in FIG. 2, the print server 100 according to the present exemplary embodiment includes a print management unit 110, a storage unit 120, and a print control unit 130. The print management unit 110 acquires print data, and performs data processing. The storage unit 120 stores the print data. The print control unit 130 controls the image forming apparatus 200. Furthermore, the print server 100 according to the present exemplary embodiment further includes a checking unit that checks a print order in which the print data have been printed.

The print management unit 110 acquires print instructions and print data from the host server 300, converts the acquired print data into intermediate data, and causes the storage unit 120 to store the intermediate data. The print data received from the host server 300 are written in a page description language (PDL). Thus, the print management unit 110 analyzes the received print data, and converts the received print data into intermediate data that are not so much dependent on the type of apparatus or a data processing environment. Then, the print management unit 110 transmits the generated intermediate data to the storage unit 120. Moreover, the print management unit 110 in the present exemplary embodiment generates history information items (hereinafter, referred to as an "output-order list"). In the output-order list, an order in which processes (hereinafter, referred to as "output processes") of outputting the print data (the intermediate data) in order to store the print data in the storage unit 120 have been performed is recorded.

The storage unit 120 temporarily stores the print data that have been converted into the intermediate data by the print management unit 110. Because a processing speed of the image forming apparatus 200 that physically forms images on recording media is lower than a data processing speed of the print server 100, the print data are stored so that the speed difference between the data processing speed of the print server 100 and the processing speed of the image forming apparatus 200 is absorbed. Accordingly, in the case where multiple print instructions are provided in a short time period, multiple print data corresponding to the print instructions may be stored in the storage unit 120. When the image forming apparatus 200 becomes capable of accepting print data, the stored print data are sequentially read and passed on to the print control unit 130.

The print control unit 130 is a so-called printer driver. When the image forming apparatus 200 is capable of accepting print data, the print control unit 130 acquires print data from the storage unit 120, and transmits the print data to the image forming apparatus 200. As described above, in the case where multiple print data are stored in the storage unit 120, the print control unit 130 acquires one of the stored print data on a one-by-one basis every time a print process performed by the image forming apparatus 200 finishes, and transmits the print data to the image forming apparatus 200. Furthermore, the print control unit 130 in the present exemplary embodiment generates history information items (hereinafter, referred to as a "print-order list"). In the print order list, an order in which processes (hereinafter, referred to as "transmission processes") of acquiring print data from the storage unit 120 and transmitting the print data to the image forming apparatus 200 have been performed is recorded. The print-order list is generated by, for example, a language monitor or port monitor that is in control of a transmission control function of the print control unit 130 which is a function for transmission to the image forming apparatus 200. Note that, because the print processes are performed by the image forming apparatus 200 on the basis of the print data transmitted through the transmission processes, an output order in which images are output through the print processes is the same as an order in which the transmission processes have been performed and which is recorded in the print-order list.

Here, among storage units 120 used in existing image forming systems, there is a storage unit 120 having a certain specification, and, in the certain specification, in the case where multiple print data are stored, an order in which the print data are read from the storage unit 120 is not guaranteed. In other words, an order in which the multiple print data are stored and the order in which the multiple print data are read may be different from each other. In such a system, for example, even in the case where print instructions for print jobs A, B, and C are provided in this order, the order is changed when print data are read from the storage unit 120, and, for example, the print jobs A, C, and B may be executed by an image forming apparatus 200 in this order.

In contrast, in the case where multiple print jobs are executed, print results may be requested to be output in an order in which print instructions have been provided. In this case, in the image forming system having the storage unit 120 that has the above-mentioned specification, the order of the output print results does not necessarily match the order of the print instructions. Accordingly, the order of the output print results needs to be checked, for example, manually. In the preset exemplary embodiment, as described below, the transmission processes performed by the print control unit 130 are checked by the checking unit 140.

The checking unit 140 compares the output-order list, which has been generated by the print management unit 110, with the print-order list, which has been generated by the print control unit 130, thereby checking whether the order in which the output processes have been performed and the order in which the transmission processes have been performed are different from each other. Then, when the order in which the output processes have been performed and the order in which the transmission processes have been performed are different from each other, the checking unit 140 performs an error process. The details of processes performed by the checking unit 140 will be described below.

It is assumed that there is a case in which, after print data has been stored in the storage unit 120, an instruction (a cancellation instruction) to cancel execution of a print job before the stored print data is read. In this case, the print data that is a target of the cancellation instruction is not read from the storage unit 120, and the print job based on the print data is not executed by the image forming apparatus 200. Then, no information item concerning the transmission process of transmitting the print data that is the target of the cancellation instruction is recorded in the print-order list. Accordingly, the order in which the output processes have been performed and which is recorded in the output-order list and the order in which the transmission processes have been performed and which is recorded in the print-order list do not match. However, a process (a cancellation process) based on the valid cancellation instruction is performed, and, consequently, mismatch between the output-order list and the print-order list occurs. Thus, no error process needs to be performed.

For this reason, when the print management unit 110 has received a cancellation instruction from the host server 300, the checking unit 140 acquires, from the print management unit 110, an information item indicating that this cancellation instruction has been provided, and holds the information item. Then, when the output-order list and the print-order list are compared with each other and mismatch therebetween is detected, the checking unit 140 determines, on the basis of the information item concerning the cancellation instruction, whether or not an error process is to be performed. Note that the information item concerning the cancellation instruction which is acquired by the checking unit 140 may be a certain notification information item that is used by the print management unit 110 to notify the checking unit 140 that the cancellation instruction has been provided, or may be the cancellation instruction itself. Moreover, the checking unit 140 may be notified, by recording the fact that the cancellation instruction has been provided in the output-order list, of the fact. In the present exemplary embodiment, a case where the information item concerning the cancellation instruction is recorded in the output-order list will be described as an example.

Example of Hardware Configuration

Figure 3:
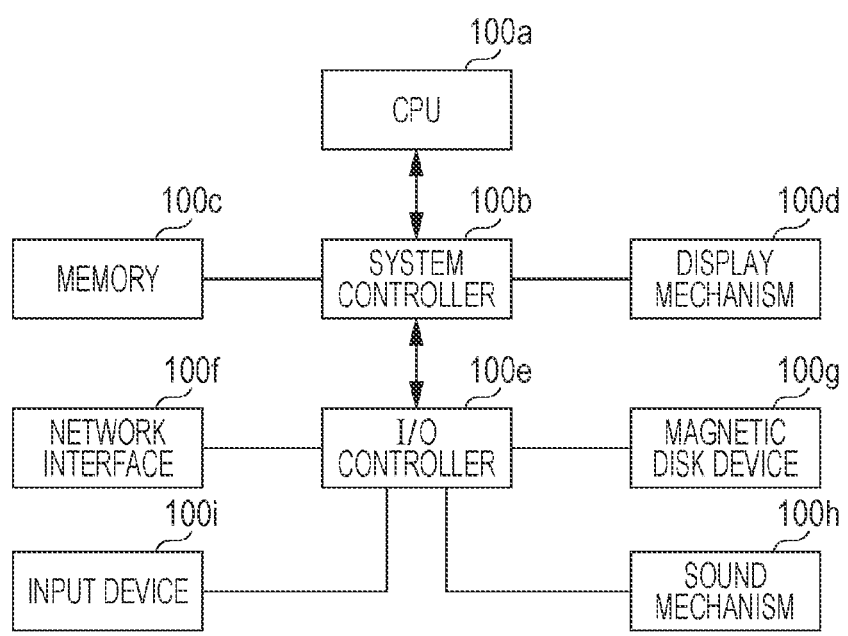
FIG. 3 is a diagram illustrating an example of a hardware configuration of the print server.

FIG. 3 is a diagram illustrating an example of a hardware configuration of the print server 100.

A computer illustrated in FIG. 3 includes a central processing unit (CPU) 100a that is a computing unit, and a memory 100c that is a main memory. Furthermore, the computer further includes a magnetic disk device (a hard disk drive (HDD)) 100g, a network interface 100f, a display mechanism 100d, a sound mechanism 100h, an input device 100i such as a keyboard or mouse, and so forth as external devices.

In the example of the configuration illustrated in FIG. 3, the memory 100c and the display mechanism 100d are connected to the CPU 100a via a system controller 100b. Moreover, the network interface 100f, the magnetic disk device 100g, the sound mechanism 100h, and the input device 100i are connected to the system controller 100b via an I/O controller 100e. The individual elements are connected to each other via various types of buses, such as a system bus and an input/output bus.

Note that FIG. 3 only illustrates an example of a hardware configuration of a computer to which the present exemplary embodiment is applied. The present exemplary embodiment is broadly applicable to a server apparatus that controls the image forming apparatus 200 on the basis of a print instruction, and realization of the present exemplary embodiment is not limited to realization using the configuration illustrated in FIG. 3.

In the computer illustrated in FIG. 3, a program for realizing the individual functions of the print server 100 is stored in the magnetic disk device 100g. This program is loaded in the memory 100c, and processes based on the program are performed by the CPU 100a, whereby the various types of functions are realized.

More specifically, the individual processes in the print management unit 110 are performed by the CPU 100a in accordance with a program that is prepared as, for example, an application program. Note that reception of print instructions and print data from the host server 300 is performed via, for example, the network interface 100f. Additionally, in the case of conversion of print data, the memory 100c is used as a working memory. Moreover, the output-order list generated by the print management unit 110 is stored in a memory such as the memory 100c or the magnetic disk device 100g.

The storage unit 120 is realized by using a memory, such as the memory 100c or the magnetic disk device 100g, as a unit that holds print data under control of the CPU 100a which executes a program module that is prepared as, for example, a portion of the function of an operating system (OS).

The individual processes in the print control unit 130 are performed by the CPU 100a in accordance with a program module that is prepared as, for example, a portion of the function of the OS. The print-order list generated by the print control unit 130 is stored in a memory such as the memory 100c or the magnetic disk device 100g.

The individual processes in the checking unit 140 are performed by the CPU 100a in accordance with a program that is prepared as, for example, an application program. In a case of notifying an operator of the print server 100 that an error has occurred, for example, the CPU 100a performs control so that the checking unit 140 performs, as an error process, a process of displaying an error message using the display mechanism 100d or a process of outputting a warning sound using the sound mechanism 100h.

Operation of Print Management Unit

Figure 4:
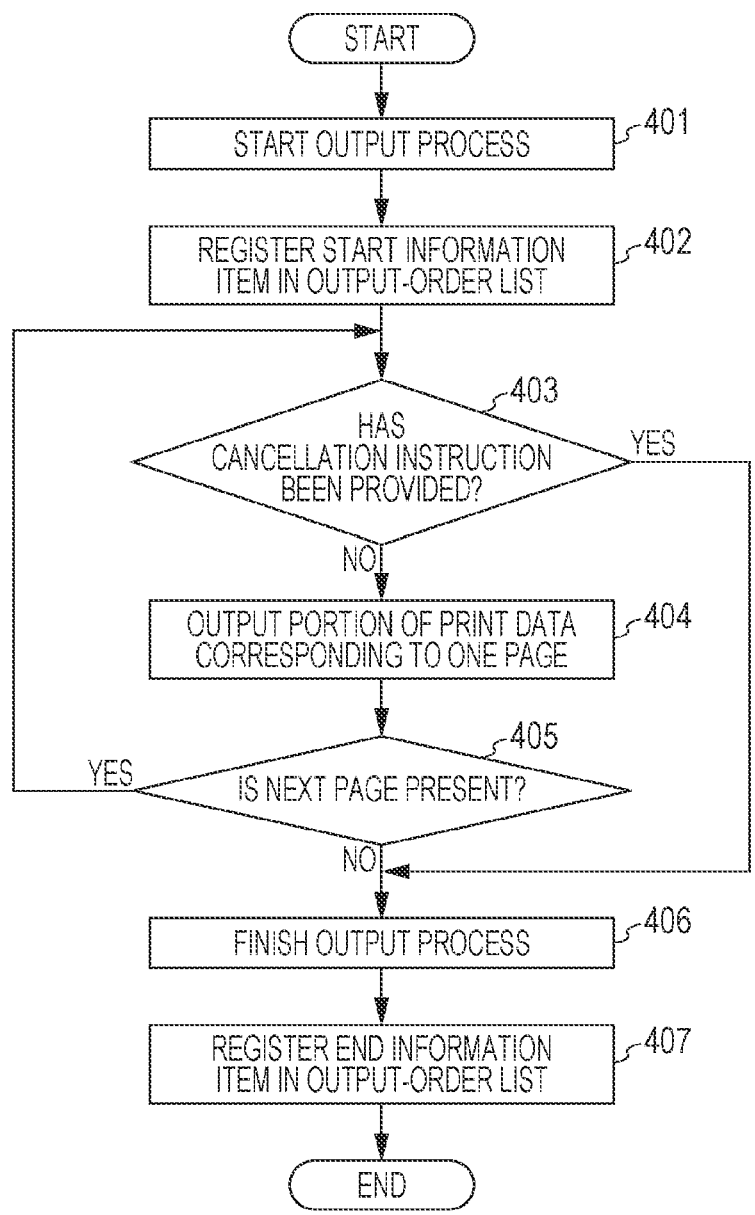
FIG. 4 is a flowchart illustrating the procedure of an output process performed by a print management unit in the present exemplary embodiment.

FIG. 4 is a flowchart illustrating the procedure of an output process performed by the print management unit 110.

When the print management unit 110 starts an output process for a print job (hereinafter, referred to as a "target (current) job") that is a process target (step 401), the print management unit 110 registers, in the output-order list, a history information item (a start information item) indicating that the output process for the target job has started (step 402). More specifically, for example, the print management unit 110 writes the start information item in a data region of the output-order list held by the memory 100c illustrated in FIG. 3. Start information items are sequentially written in the output-order list in such a manner that the output-order list is filled from the top thereof. The form of each of the start information items is not particularly limited, but at least an identification information item (a job name, a job number, or the like) of the target job and an information item by which a start information item including the information item is identified as a start information item may be recorded.

Next, the print management unit 110 outputs print data (intermediate data), and stores the print data in the storage unit 120. More specifically, first, the print management unit 110 determines whether or not a cancellation instruction has been accepted (step 403). When the print management unit 110 has not accepted a cancellation instruction, the print management unit 110 outputs a portion of the print data corresponding to one page, and stores the portion of the print data corresponding to one page in the storage unit 120 (step 404). These processes are repeatedly performed until the processes are performed on all portions of the print data corresponding to all pages (step 405).

After all portions of the print data corresponding to all pages for the target job have been output (NO in step 405) or when a cancellation instruction has been accepted (YES in step 403), the print management unit 110 finishes the output process for the target job (step 406). Then, the print management unit 110 registers, in the output-order list, a history information item (an end information item) indicating that the output process for the target job has finished (step 407). As in the case of start information items, end information items are sequentially written in, for example, the data region of the output-order list held by the memory 100c illustrated in FIG. 3. The form of each of the end information items is not particularly limited, but at least the identification information item of the target job and an information item by which an end information item including the information item is identified as an end information item may be recorded.

Figure 5:
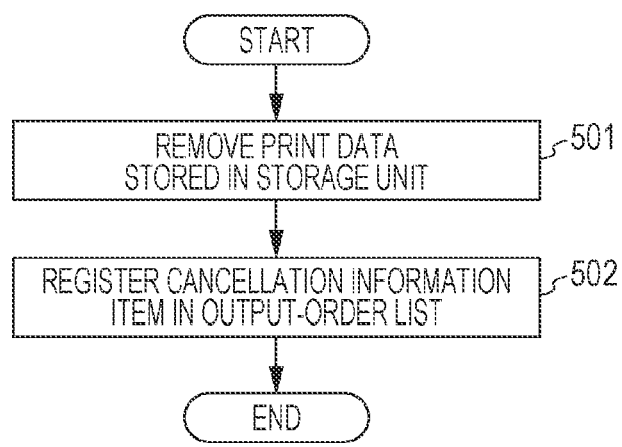
FIG. 5 is a flowchart illustrating the procedure of a process performed by the print management unit in the case where a cancellation instruction is accepted.

FIG. 5 is a flowchart illustrating the procedure of a process performed by the print management unit 110 in the case where a cancellation instruction is accepted.

In the case where the print management unit 110 has accepted a cancellation instruction in step 403 illustrated in FIG. 4, the print management unit 110 finishes the output process as illustrated in FIG. 4, and removes the print data stored in the storage unit 120 in steps 404 and 405 (step 501). Then, the print management unit 110 registers, in the output-order list, a history information item (a cancellation information item) indicating that the cancellation instruction for the target job has been provided (step 502). As in the cases of start information items and end information items, cancellation information items are sequentially written in, for example, the data region of the output-order list held by the memory 100c illustrated in FIG. 3. The form of each of the cancellation information items is not particularly limited, but at least the identification information item of the target job and an information item by which a cancellation information item including the information item is identified as a cancellation information item may be recorded.

Here, after the output process for the target job has finished, a cancellation instruction for the target job may be provided. In this case, because the output process has already finished, in the procedure illustrated in FIG. 4, no operation based on the cancellation instruction is performed. However, removal of the print data (step 501) and registration of a cancellation information item (step 502), which are illustrated in FIG. 5, are performed. Note that it is assumed that there is a system in which, after print data has been read from the storage unit 120 by the print control unit 130, the read print data is removed from the storage unit 120. In this system, in the case where a cancellation instruction is provided after print data has been read from the storage unit 120, the print data that is a target may be absent in the storage unit 120 even when the print management unit 110 tries to remove the print data (step 501). In this case, simply, only registration of a cancellation information item (step 502) is performed.

Operation of Print Control Unit

FIG. 6 is a system flow diagram illustrating the procedure of transmission processes performed by the storage unit 120 and the print control unit 130.

In FIG. 6, an operation of the storage unit 120 that holds print data which are process targets (transmission targets) of the print control unit 130, and operations of the language monitor 132 and the port monitor 133 that are in charge of the transmission control function of the print control unit 130 are illustrated. Here, when the image forming apparatus 200 is capable of accepting print data, the storage unit 120 sequentially outputs stored print data. The language monitor 132 transmits the print data, which have been output from the storage unit 120, to the image forming apparatus 200 via the port monitor 133. Furthermore, the language monitor 132 outputs history information items indicating the progress of the transmission processes. The port monitor 133 transmits the print data, which have been received from the language monitor 132, to the image forming apparatus 200, and monitors the progress of the transmission processes.

When the image forming apparatus 200 is capable of accepting print data, first, the storage unit 120 determines a target job, and outputs a print start instruction (step 601). This print start instruction is transmitted to the image forming apparatus 200 via the language monitor 132 and the port monitor 133 of the print control unit 130. In this case, regarding determination of a target job, the storage unit 120 may have a specification in which a target job that is a target of a transmission process is determined in accordance with the order in which the print data have been stored in the storage unit 120, but the specification of the storage unit 120 is not limited thereto as described above. Note that, for example, the port monitor 133 transmits an inquiry signal to the image forming apparatus 200, and a response from the image forming apparatus 200 is transmitted to the storage unit 120, whereby whether or not the image forming apparatus 200 is capable of accepting print data is determined by the storage unit 120.

When the language monitor 132 has received the print start instruction, the language monitor 132 registers, in the print-order list, a history information item (a start information item) indicating that a transmission process for the target job has started (step 611). More specifically, for example, the language monitor 132 writes the start information item in a data region of the print-order list held by the memory 100c illustrated in FIG. 3. Start information items are sequentially written in the print-order list in such a manner that the print-order list is filled from the top thereof. The form of each of the start information items is not particularly limited, but at least an identification information item (a job name, a job number, or the like) of the target job and an information item by which a start information item including the information item is identified as a start information item may be recorded.

Next, the storage unit 120 sequentially read portions of the print data corresponding to pages for the target job on a page-by-page basis, and passes on the print data to the print control unit 130 (step 602). The print control unit 130 transmits, using the language monitor 132 and the port monitor 133, the acquired print data to the image forming apparatus 200.

When all of the portions of the print data for the target job have been transmitted, the storage unit 120 outputs a print end instruction for the target job (step 603). The print end instruction is transmitted to the image forming apparatus 200 via the language monitor 132 and the port monitor 133 of the print control unit 130. After that, when the port monitor 133 has received a notification indicating that output of all of the portions of the print data for the target job from the image forming apparatus 200 has been completed, the port monitor 133 transmits this notification to the language monitor 132 (step 621).

When the language monitor 132 has received the notification, which has been received from the image forming apparatus 200, from the port monitor 133, the language monitor 132 registers, in the print-order list, a history information item (an end information item) indicating that the transmission process for the target job has finished (step 612). As in the case of start information items, end information items are sequentially written in, for example, the data region of the print-order list held by the memory 100c illustrated in FIG. 3. The form of each of the end information items is not particularly limited, but at least the identification information item of the target job and an information item by which an end information item including the information item is identified as an end information item may be recorded.

In this manner, a transmission process for one print job finishes. After that, in the case where print data for another print job is stored in the storage unit 120, similarly, the transmission process is repeated. Referring to FIG. 6, sequentially, a transmission process for the next target job is performed (see steps 604, 605, and 613). Then, a cancellation instruction is provided while the transmission process is being performed.

As illustrated in FIG. 5, when the print management unit 110 has accepted a cancellation instruction, the print management unit 110 removes print data stored in the storage unit 120 (see step 501). When the storage unit 120 performs removal of the print data, the storage unit 120 outputs a print cancellation instruction for a print job related to the print data (step 606 in FIG. 6).

When the language monitor 132 has received the print cancellation instruction, the language monitor 132 registers, in the print-order list, a history information item (a cancellation information item) indicating that the transmission process for the target job has been cancelled (step 614). As in the cases of start information items and end information items, cancellation information items are sequentially written in, for example, the data region of the print-order list held by the memory 100c illustrated in FIG. 3. The form of each of the cancellation information items is not particularly limited, but at least the identification information item of the target job and an information item by which a cancellation information item including the information item is identified as a cancellation information item may be recorded.

Note that, as timings at which a print cancellation instruction is output, the following three timings are considered: before a transmission process for a print job corresponding to the print cancellation instruction starts; while the transmission process is being performed; and after the transmission process has finished. In the case where the cancellation instruction has been provided before the transmission process starts, because the transmission process is not performed, no print process is performed by the image forming apparatus 200. In the case where the cancellation instruction has been provided while the transmission process being performed, a print process is performed by the image forming apparatus 200 on portions of print data that have been subjected to the transmission process before the cancellation instruction is provided. No print process is performed by the image forming apparatus 200 on the remaining portions of the print data that have not been subjected to the transmission process when the cancellation instruction is provided. In the case where the cancellation instruction is provided after the transmission process has finished, because all of the portions of the print data for the print job have already been subjected to the transmission process, all images for the print job are output by the image forming apparatus 200. In any of the cases, a cancellation information item is output from the language monitor 132, and is registered in the print-order list.

Examples of Configurations of Output-Order List and Print-Order List

Figure 7A:
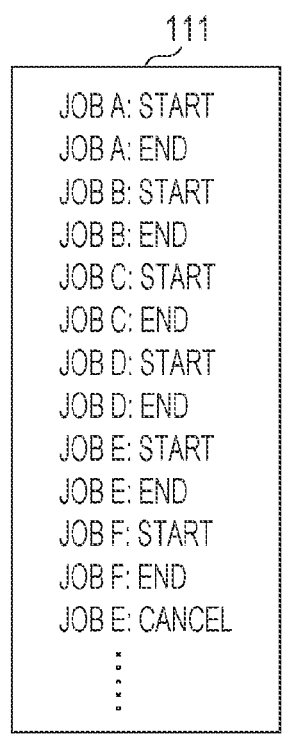
FIGS. 7A and 7B are diagrams illustrating examples of an output-order list and a print-order list in the present exemplary embodiment.
Figure 7B:
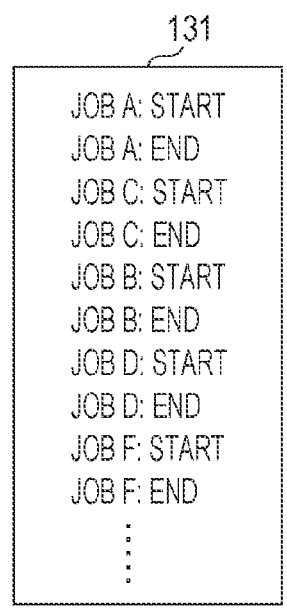

FIGS. 7A and 7B are diagrams illustrating examples of the output-order list and the print-order list.

FIG. 7A illustrates an output-order list 111. In this output-order list 111, history information items (each of which is a start information item, an end information item, or a cancellation information item) concerning output processes for six print jobs A to F are recorded. Each of the history information items includes a job name and a type of information item. For example, the history information item included in the top row is a start information item concerning the print job A, and is "job A: start". Similarly, the history information item included in the second row is an end information item concerning the print job A, and is "job A: end". Furthermore, the history information item included in the thirteenth row is a cancellation information item concerning the print job E, and is "job E: cancel".

FIG. 7B illustrates a print-order list 131. In this print-order list 131, history information items (each of which is a start information item or an end information item) concerning transmission processes for the six print jobs A to F are recorded. Each of the history information items includes a job name and a type of information item, as in the case of the history information items of the output-order list 111 illustrated in FIG. 7A.

Here, when the output-order list 111 illustrated in FIG. 7A and the print-order list 131 illustrated in FIG. 7B are compared with each other, in the output-order list 111, the third row includes a start information item concerning the job B, the fourth row includes an end information item concerning the job B, the fifth row includes a start information item concerning the job C, and the sixth row includes an end information item concerning the job C. Meanwhile, in the print-order list 131, the third row includes a start information item concerning the job C, the fourth row includes an end information item concerning the job C, the fifth row includes a start information item concerning the job B, and the sixth row includes an end information item concerning the job B. In other words, the ordinal positions of the output processes for the job B and the job C in the order in which the output processes have been performed are swapped, resulting in the ordinal position of the transmission process for the job B and the ordinal position of the transmission process for the job C in the order in which the transmission processes have been performed.

Furthermore, because a cancellation instruction for the job E has been provided, no history information item concerning the job E is present in the print-order list 131. Accordingly, in the output-order list 111, the ninth row and the tenth row include a start information item and an end information item, respectively, concerning the job E, and the eleventh row and the twelfth row include a start information item and an end information item, respectively, concerning the job F. Meanwhile, in the print-order list 131, the ninth row and the tenth row include a start information item and an end information item, respectively, concerning the job F. Note that no cancellation information item concerning the job E is recorded in the print-order list 131. The reason for this is that the print-order list 131 illustrated in FIG. 7B indicates the state of the print-order list 131 before a cancellation information item is output from the language monitor 132 of the print control unit 130.

Operation of Checking Unit

The checking unit 140 compares the history information items recorded in the output-order list 111 and the history information items recorded in the print-order list 131, thereby checking whether an order in which the output processes for the print jobs have been performed and an order in which the transmission processes for the print jobs have been performed are the same. Checking of an order in which processes have been performed is performed by the checking unit 140 in units of print jobs. Accordingly, the orders of the processes in the individual lists (the output-order list 111 and the print-order list 131) may be compared with each other with respect to only either the start information items or the end information items among the history information items. In the present exemplary embodiment, the orders in which the individual processes (the output processes and the transmission processes) for the print jobs have been performed are checked using the start information items.

Furthermore, the checking unit 140 checks the print-order list 131 at appropriate time intervals (for example, every few seconds). When the number of data registered in the print-order list 131 has increased, compared with the number of data obtained when the checking unit 140 immediately previously checked the print-order list 131, the checking unit 140 performs a checking process. In this manner, in the case where no new transmission process has been performed, the checking process may be omitted. Whether the number of data registered in the print-order list 131 has increased may be determined by opening a data file of the print-order list 131 and checking the number of registered data, or simply on the basis of the file size of the print-order list 131.

Figure 8A:
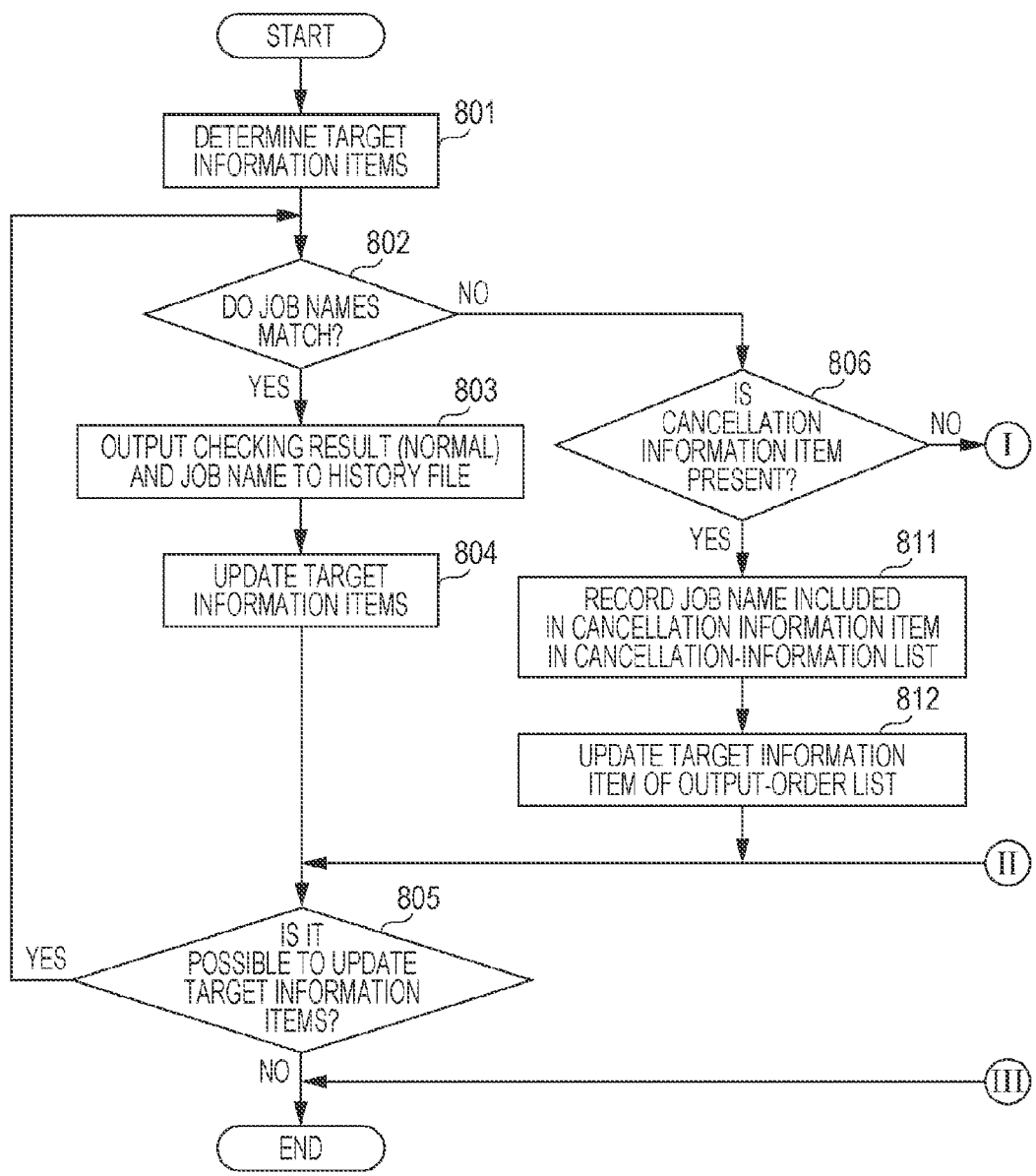

FIGS. 8A and 8B are a first part and a second part, respectively, of a flowchart illustrating the procedure of the checking process, which is performed by the checking unit 140, of checking a print order.

First, the checking unit 140 determines history information items (hereinafter, referred to as "target information items") that are to be first used as checking targets (step 801). Here, among start information items that are registered in the individual lists and that have not been checked, start information items that are registered in the top rows are determined as the target information items. Next, the checking unit 140 compares job names included in the determined target information items with each other (step 802).

In the case where the job names included in the compared target information items match (YES in step 802), this indicates that, regarding a print job specified by the target information items, the ordinal position of the transmission process for the print job in the order in which the transmission processes have been performed (i.e., the ordinal position of a print process for the print job in the order in which print processes have been performed by the image forming apparatus 200) and the ordinal position of the output process for the print job in the order in which the output processes have been performed (i.e., the ordinal position of a print instruction for the print job in the order in which print instructions have been accepted by the print server 100) are the same. Accordingly, because the ordinal position of the print instruction for the print job in the order in which the print instructions have been accepted and the ordinal position of a print process for the print job in the print order in which the print processes have been performed are not different from each other, the checking unit 140 outputs, to a history file, a checking result indicating that the ordinal position of the transmission process for the print job in the order in which the transmission processes have been performed (the ordinal position of the print process for the print job in the print order in which the print processes have been performed) is a normal position, and the job name included in the target information items (in step 803). The form of an information item recorded in the history file is not particularly limited, but at least an identification information item (here, the job name) of the print job and an information item indicating the details of the checking result (here, the information item indicating that the ordinal position of the transmission process for the print job in the order in which the transmission processes have been performed is a normal position) may be recorded. The history file including the checking result is held by a memory such as the memory 100*c* or the magnetic disk device 100*g* illustrated in FIG. 3, and this allows, for example, the operator of the image forming system to view the history file.

Next, the checking unit 140 updates the target information items to the next history information items (start information items) in the individual lists (steps 804 and 805), and compares the updated target information items with each other (step 802). In the case where the history information items up to the last history information item in any one of the output-order list 111 and the print-order list 131 have been checked, because it is no longer possible to update the target information items (NO in step 805), the checking process finishes.

In the case where the job names do not match when the target information items are compared with each other (NO in step 802), next, the checking unit 140 checks whether or not a cancellation information item concerning the job name included in the target information item of the output-order list 111 is present in the output-order list 111 (step 806).

In the case where the cancellation information item is present, execution of a print job having the print job name has been canceled. Thus, this mismatch between the job names does not indicate that an abnormality in the print order has occurred. Accordingly, the checking unit 140 does not output any checking result to the history file. However, in order to indicate that execution of the print job has been cancelled, the job name included in the cancellation information item is recorded in a cancellation-information list (step 811). Then, the checking unit 140 updates only the target information item of the output-order list 111 to the next history information item (start information item) (steps 812 and 805). The checking unit 140 compares the target information item of the output-order list 111 with the target information item of the print-order list 131 (step 802).

In the case where the job names do not match (NO in step 802) when the target information items are compared with each other and where no cancellation information item concerning the job name included in the target information item of the output-order list 111 is present (NO in step 806), next, the checking unit 140 checks whether or not the job name included in the target information item of the output-order list 111 is present in the history file including checking results that have been obtained so far (step 807). Here, a configuration may be used, in which whether or not the job name included in the target information item of the output-order list 111 is present in any one of the history information items that have already been checked in the print-order list 131, instead of in the history file, is checked. However, data registered in the output-order list 111 and the print-order list 131 are removed, at an appropriate timing after the data have been checked, so that the storage capacity of a memory that the print server 100 has is not reduced. Thus, when search for the job name is performed in step 807, it is highly probable that the job name has already been removed. For this reason, the job name included in the target information item is searched for in the history file that is held so as to be viewed by, for example, the operator of the image forming system, whereby search for the job name may be assuredly performed.

Note that, because the history file is a file that may be viewed by, for example, the operator of the image forming system, the history file is held for a predetermined time period. Accordingly, for example, when the image forming system or the function of checking a print order in the present exemplary embodiment is reactivated, checking results that have been recorded before the image forming system or the function of checking a print order is reactivated are also held. However, in the current checking process, whether or not the job name included in the target information item of the output-order list 111 is present in any one of checking results that have been recorded since the function of checking a print order was last reactivated may be checked. Accordingly, in the case of search for the job name in step 807, checking results in which the job name is to be searched for by retracing the history file may be checking results that have been recorded since the function of checking a print order was activated this time.

In the case where the job name included in the target information item is present in the history file including checking results, this indicates that a print job having the job name has already been executed, and an abnormality in the print order has occurred. Furthermore, the ordinal position of the target information item in the order in which the output processes have been performed in the output-order list 111 is the ordinal position at which the transmission process for the print job having the job name should have been performed in the order in which the transmission processes have been performed. Accordingly, the checking unit 140 outputs, to the history file, a checking result (abnormal 1) indicating that the ordinal position at which the transmission process for the print job should have been performed in the order in which the transmission processes have been performed and the job name included in the target information item of the output-order list 111 (step 813). Then, the checking unit 140 updates only the target information item of the output-order list 111 to the next history information item (start information item)

(steps 814 and 805), and compares the target information item of the output-order list 111 with the target information item of the print-order list 131 (step 802).

In the case where the job names do not match when the target information items are compared with each other (NO in step 802), where no cancellation information item concerning the job name included in the target information item of the output-order list 111 is present (NO in step 806), and where the job name included in the target information item of the output-order list 111 is not present in the history file including checking results that have been obtained so far (NO in step 807), next, the checking unit 140 checks whether or not the job name included in the target information item of the print-order list 131 is present in the range of the history information items that have not been checked in the output-order list 111 (step 808).

In the case where the job name included in the target information item of the print-order list 131 is present in the range of the history information items that have not been checked in the output-order list 111, this indicates that the ordinal position at which the transmission process for a print job having the job name should have been performed in the order in which the transmission processes have been performed is later than the current ordinal position, and that an abnormality in the print order has occurred. Accordingly, the checking unit 140 outputs, to the history file, a checking result (abnormal 2) indicating that the transmission process for the print job has been performed at an ordinal position earlier than the ordinal position at which the transmission process for the print job should have been performed in the order in which the transmission processes have been performed, and the job name included in the target information item of the print-order list 131 (step 815). Then, the checking unit 140 updates only the target information item of the print-order list 131 to the next history information item (start information item) (steps 816 and 805), and compares the target information item of the print-order list 131 with the target information item of the output-order list 111 (step 802).

In the case where the job names do not match when the target information items are compared with each other (NO in step 802), where no cancellation information item concerning the job name included in the target information item of the output-order list 111 is present (NO in step 806), where the job name included in the target information item of the output-order list 111 is not present in the history file including checking results that have been obtained so far (NO in step 807), and where the job name included in the target information item of the print-order list 131 is not present in the range of the history information items that have not been checked in the output-order list 111 (NO in step 808), next, the checking unit 140 checks whether or not the job name included in the target information item of the print-order list 131 is present in the cancellation-information list (step 809).

In the case where the job name included in the target information item is present in the cancellation-information list, this indicates that, although a cancellation instruction for a print job having the job name that has been provided, the transmission process for the print job has been performed before print data is removed from the storage unit 120. Then, the print job has been executed, whereby a print process for the print job has been performed at an ordinal position, in the order in which the print processes have been performed, different from an ordinal position at which a print instruction for the print job has been provided in the order in which the print instructions have been provided. Thus, an abnormality in the print order has occurred. Accordingly, the checking unit 140 outputs, to the history file, a checking result (abnormal 2) indicating that the transmission process for the print job has been performed at an ordinal position earlier than the ordinal position at which the transmission process for the print job should have been performed in the order in which the transmission processes have been performed, and the job name included in the target information item of the print-order list 131 (step 817). Then, the checking unit 140 updates only the target information item of the print-order list 131 to the next history information item (start information item) (steps 818 and 805). The checking unit 140 compares the target information item of the print-order list 131 with the target information item of the output-order list 111 (step 802).

In the case where the job names do not match when the target information items are compared with each other (NO in step 802), where no cancellation information item concerning the job name included in the target information item of the output-order list 111 is present (NO in step 806), where the job name included in the target information item of the output-order list 111 is not present in the history file including checking results that have been obtained so far (NO in step 807), where the job name included in the target information item of the print-order list 131 is not present in the range of the history information items that have not been checked in the output-order list 111 (NO in step 808), and where the job name included in the target information item of the print-order list 131 is not present in the cancellation-information list (NO in step 809), there is a high probability that an abnormality different from a simple change in the print order has occurred. The checking unit 140 notifies the operator of the print server 100 that an abnormality has occurred (step 810). Notification of occurrence of an abnormality is performed by, for example, displaying an error message using the display mechanism 100d illustrated in FIG. 3, or by outputting a warning sound using the sound mechanism 100h illustrated in FIG. 3. Moreover, in the case where there is a high probability that the abnormality severely affects the image forming system, control may be performed so that execution of the print job will be forcibly stopped.

In the present exemplary embodiment, as described above, it is assumed that there are four types of cases (see steps 806 to 809 illustrated in FIGS. 8A and 8B) as cases where the output-order list 111 and the print-order list 131 do not match. Among the cases, in the cases other than the case where execution of a print job has been cancelled (see step 806), print jobs have been executed in an incorrect order. Accordingly, the checking unit 140 performs an error process of notifying, for example, the operator of the print server 100 that an abnormality in the print order has occurred. In the above-described example, as the error process, the checking unit 140 performs a process of recording an information item indicating that an abnormality in the print order has occurred in the history file which includes checking results and which is viewable by, for example, the operator of the print server 100. Alternatively, as in the case of notification of an abnormality in step 810, the checking unit 140 may perform, for example, display of an error message using the display mechanism 100d or output of a warning sound using the sound mechanism 100h.

The checking unit 140 may perform different error processes for the types of cases where an error process is performed. For example, in the case where the transmission process for the print job has been performed at an ordinal position earlier than the ordinal position at which the transmission process for the print job should have been performed in the order the transmission processes have been performed (see step 808), display of an error message or output of a warning sound may be performed. In the other cases, without performing display of an error message or output of a warning sound, only recording of an information item in the history file may be performed. Regarding which error process is to be applied to each of the cases, a selection of an error process made by, for example, a user of the image forming system according to the present exemplary embodiment may be accepted, and the selected error process may be set.

Note that, in the above-described example of the operation of the checking unit 140, in the case where a cancellation information item concerning the job name included in the target information item of the output-order list 111 is present in step 806, the job name included in the cancellation information item is recorded in the cancellation-information list (see step 811). Then, in step 809, whether or not the job name included in the target information item of the print-order list 131 is present in the cancellation-information list is checked, whereby whether or not a cancellation instruction for the print job has been provided is determined. Here, without generating the cancellation-information list, instated of checking the cancellation-information list in step 809, whether or not a cancellation information item is present in the range of the history information items that have not been checked in the output-order list 111 may be checked. However, every time determination of whether or not a cancellation information item is present is performed, the output-order list 111 in which a large number of history information items are recorded is searched for a cancellation information item in order from the history information item included in the top row. This leads to much duplication in processing, and, consequently, the processing efficiency is low. Furthermore, because the storage capacity of a memory that the print server 100 has is limited, regarding the output-order list 111 and the print-order list 131, data registered therein are removed on the basis of an appropriate condition of a data volume, a period, or the like. For this reason, separately from the output-order list 111, a cancellation-information list is generated, and, in step 809, this cancellation-information list is searched for the job name. This achieves an improvement in the processing efficiency, and makes possible to search for a cancellation information item even when the cancellation information item is removed from the output-order list 111. Furthermore, the cancellation-information list is held and viewable by, for example, the operator of the print server 100. Thus, this makes possible for, for example, the operator to check that a cancellation instruction for a print job has been provided.

As described above, regarding the output-order list 111 and the print-order list 131, data registered therein are removed on the basis of an appropriate condition of a data volume, a period, or the like. More specifically, a removal process may be performed on the output-order list 111 and the print-order list 131, for example, in the following manner. In other words, regarding the output-order list 111 and the print-order list 131, the upper-limit sizes thereof are determined in advance. For each of the lists, the upper-limit size thereof is set on the basis of the data size of the list or the number of history information items registered in the list. Then, every time a print instruction is provided, a history information item is additionally recorded in the list. When the size of the list reaches the upper-limit size thereof, a new list is generated. Then, the next history information item is registered in the new list. The checking unit 140 continues checking history information items included in the list whose size has reached the upper-limit size thereof. When all history information items registered in the list have been checked, the list is removed. In this manner, history information items that have already been checked are removed, whereby it makes possible to save the hardware resources of the print server 100.

Note that, in the above-described example of the operation of the checking unit 140, which is illustrated in FIGS. 8A and 8B, the determination processes of steps 806, 807, 808, and 809 are performed in this order. However, regarding steps 806, 807, and 808, the ordinal positions thereof in the order may be replaced with each other. Furthermore, when, for example, a fixed number of job names or a fixed number of job numbers are repeatedly used as the identification information items of print jobs, the determination process of step 809 needs to be performed after the determination processes of steps 806, 807, and 808 are performed. However, when the individual identification information items are uniquely determined, the determination process of step 809 may be performed at an ordinal position earlier than the current ordinal position of step 809 in the order.

Examples of Checking of History Information Items

Figure 9A:
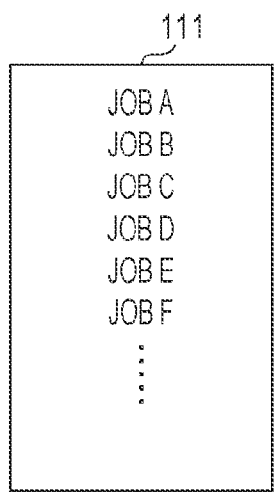
FIGS. 9A to 9C are diagrams illustrating specific examples of lists in which only start information items included in the individual lists illustrated in FIGS. 7A and 7B are arranged and a history file including checking results.
Figure 9B:
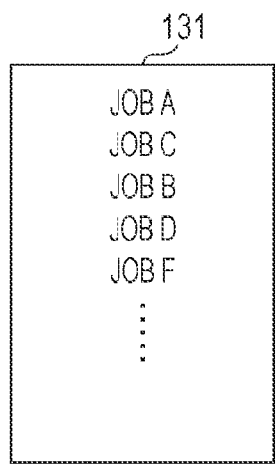
Figure 9C:
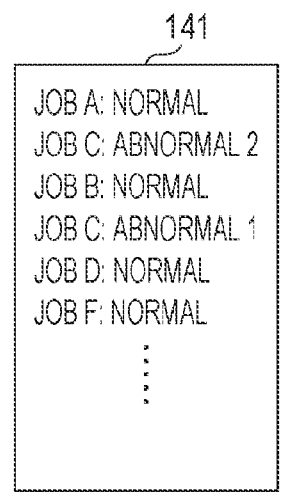

FIGS. 9A to 9C are diagrams illustrating specific examples of lists in which only start information items included in the individual lists illustrated in FIGS. 7A and 7B are arranged and the history file including checking results.

Checking performed by the checking unit 140 will be further described using the specific examples illustrated in FIGS. 9A to 9C. An output-order list 111 illustrated in FIG. 9A and a print-order list 131 illustrated in FIG. 9B are denoted by reference numerals the same as those denoting the individual lists illustrated in FIGS. 7A and 7B. Additionally, in the individual lists of FIGS. 9A and 9B, only the job names included in the start information items are arranged. Moreover, in a history file 141 illustrated in FIG. 9C, an information item representing a checking result ("normal", or "abnormal 1" or "abnormal 2" which are shown in the example illustrated in FIGS. 8A and 8B) is added to each of the history information items.

First, the checking unit 140 compares, as the target information items, the start information items included in the top rows of the output-order list 111 and the print-order list 131 which are illustrated in FIGS. 9A and 9B, respectively (see steps 801 and 802 in FIG. 8A). Here, because both of the target information items are the "job A", the target information items match. Thus, it is determined that the print order is a normal order. Then, the checking unit 140 records the job name "job A" and a checking result "normal" in the history file 141.

Next, the checking unit 140 updates the target information items of both of the lists, and compares the target information items with each other (see steps 804, 805, and 802). Here, because the target information item of the output-order list 111 is the "job B" and the target information item of the print-order list 131 is the "job C", the target information items do not match.

Next, the checking unit 140 checks whether a cancellation information item concerning the job B is present in the output-order list 111 (see step 806). As described with reference to FIG. 7A, no cancellation information item concerning the job B is present (a cancellation instruction has not been provided). Accordingly, next, the checking unit 140 checks whether a checking result about the job B is present in the history file 141 (see step 807). Here, only a checking result about the job A is present in the history file 141. Accordingly, next, the checking unit 140 checks whether the start information item concerning the job C is present in the range of the history information items that have not been checked in the output-order list 111 (see step 808). Here, the start information item concerning the job C is present next to the start information item concerning the job B in the output-order list 111. Accordingly, it is determined that the print order is an abnormal order and that a transmission process for the job C has been performed at an ordinal position earlier than the ordinal position at which the transmission process for the job C should have been performed in the order in which transmission processes have been performed. Then, the checking unit 140 records the job name "job C" and a checking result "abnormal 2" in the history file 141.

Next, the checking unit 140 updates the target information item of the print-order list 131, and compares the target information items with each other (see steps 816, 805, and 802). Here, because both of the target information items are "job B", the target information items match. Thus, it is determined that the print order is a normal order. Then, the checking unit 140 records the job name "job B" and a checking result "normal" in the history file 141.

Next, the checking unit 140 updates the target information items of both of the lists, and compares the target information items with each other (see steps 804, 805, and 802). Here, because the target information item of the output-order list 111 is the "job C" and the target information item of the print-order list 131 is the "job D", the target information items do not match.

Next, the checking unit 140 checks whether a cancellation information item concerning the job C is present in the output-order list 111 (see step 806). As described with reference to FIG. 7A, no cancellation information item concerning the job C is present (a cancellation instruction has not been provided). Accordingly, next, the checking unit 140 checks whether a checking result about the job C is present in the history file 141 (see step 807). Here, a checking result about the job C is present in the second row of the history file 141. Accordingly, it is determined that the print order is an abnormal order, and that an ordinal position at which the job C should have been executed is the current ordinal position in the order in which the jobs have been executed. Then, the checking unit 140 records the job name "job C" and a checking result "abnormal 1" in the history file 141.

Next, the checking unit 140 updates the target information item of the output-order list 111, and compares the target information items with each other (see steps 814, 805, and 802). Here, because both of the target information items are the "job D", the target information items match. Thus, it is determined that the print order is a normal order. Then, the checking unit 140 records the job name "job D" and a checking result "normal" in the history file 141.

Next, the checking unit 140 updates the target information items of both of the lists, and compares the target information items with each other (see steps 804, 805, and 802). Here, because the target information item of the output-order list 111 is the "job E" and the target information item of the print-order list 131 is the "job F", the target information items do not match.

Next, the checking unit 140 checks whether a cancellation information item concerning the job E is present in the output-order list 111 (see step 806). As described with reference to FIG. 7A, a cancellation information item concerning the job E is present (a cancellation instruction has been provided). Accordingly, the checking unit 140 records the job name "job E" in the cancellation-information list (not illustrated).

Next, the checking unit 140 updates the target information item of the output-order list 111, and compares the target information items with each other (see steps 812, 805, and 802). Here, because both of the target information items are "job F", the target information items match. Thus, it is determined that the print order is a normal order. Then, the checking unit 140 records the job name "job F" and a checking result "normal" in the history file 141. In this manner, checking of the jobs up to the job F has been completed, and checking results are recorded in the history file 141.

Here, referring to the history file 141 illustrated in FIG. 9C, "job A: normal", "job C: abnormal 2", "job B: normal", "job C: abnormal 1", "job D: normal", and "job F: normal" are recorded as checking results. In other words, according to the recorded checking results, the normal print order in which the print jobs should have been executed is the order of the job A, the job B, the job C, the job D, and the job F. However, it is understandable that an abnormality, i.e., swapping of the ordinal position of the job B and the ordinal position of the job C in the print order, has occurred.

Example of Checking of History Information Items in Case Where Cancellation Instruction is Provided In the examples illustrated in FIGS. 9A to 9C, for the print job having the job name "job E", a cancellation instruction is provided after an output process has been performed. In accordance with the cancellation instruction, a transmission process for the print job is cancelled. However, as mentioned when the procedure of the process performed by the print control unit 130 is described with reference to FIG. 6, in reality, depending on timing at which a cancellation instruction is provided, a transmission process for a print job that is a cancellation target may be performed. Hereinafter, a process performed by the checking unit 140 in the case where a cancellation instruction is provided will be described using specific examples. Note that a cancellation instruction is accepted while a transmission process is being performed, and a print process for a print job which is a cancellation target is performed but has not been completed. However, here, in this case, it is assumed that the print process for the print job is performed. Furthermore, as in the case of description with reference to the examples illustrated in FIGS. 9A to 9C, it is assumed that an output-order list 111 and a print-order list 131 are checked by comparing start information items included therein with each other.

FIGS. 10A to 10C and FIGS. 11A to 11C are diagrams illustrating examples of checking performed by the checking unit 140 in the case where a cancellation instruction is provided.

Figure 10A:
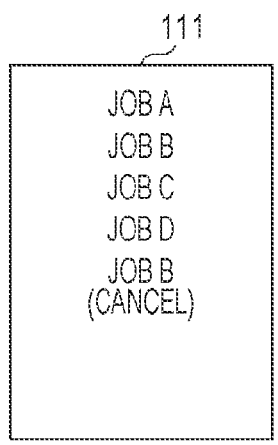
FIGS. 10A to 10C are diagrams illustrating an example of checking performed by the checking unit in the case where a cancellation instruction is provided.
Figure 10B:
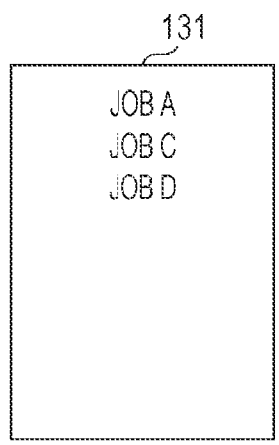
Figure 10C:
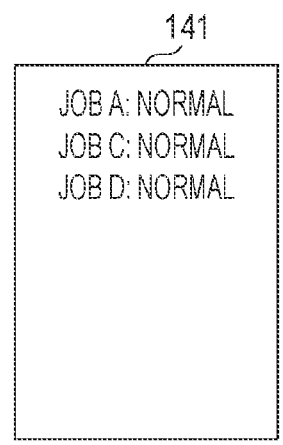
Figure 11A:
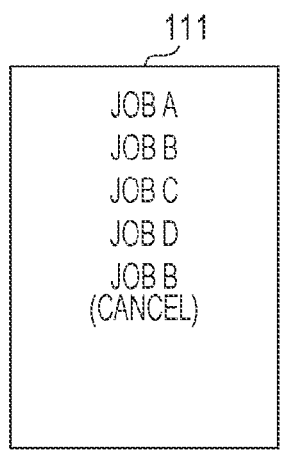
FIGS. 11A to 11C are diagrams illustrating another example of checking performed by the checking unit in the case where a cancellation instruction is provided.
Figure 11B:
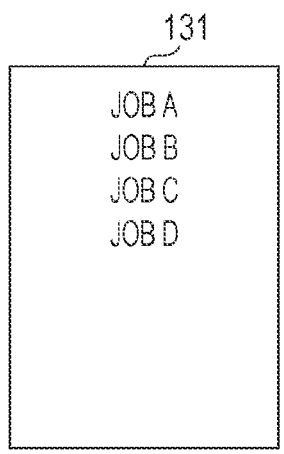
Figure 11C:
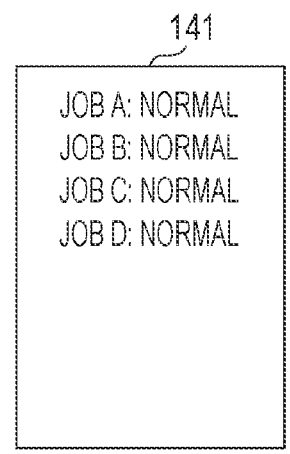

In the examples illustrated in FIGS. 10A to 10C and FIGS. 11A to 11C, checking results obtained in the case where print instructions for four print jobs A to D are provided and where, after that, a cancellation instruction for the print job B is provided are illustrated. FIGS. 10A to 10C illustrate a case where no transmission process is performed in accordance with the cancellation instruction. FIGS. 11A to 11C illustrate a case where a transmission process has been performed before the cancellation instruction is accepted. Note that output-order lists 111 and print-order lists 131 illustrated in FIGS. 10A and 10B and FIGS. 11A and 11B indicate states in which only a start information item or a cancellation information item included in each history information item is arranged (the cancellation information item being explicitly indicated).

An operation performed in the case where no transmission process is performed in accordance with a cancellation instruction is similar to the operation that is mentioned when the case where checking of the history information items concerning the job name "job E" and the job name "job F" is described with reference to FIGS. 9A to 9C. In other words, as illustrated in FIG. 10A, because a cancellation instruction for the print job B is provided, the start information item and the cancellation information item concerning the job B are recorded in the output-order list 111. In contrast, as illustrated in FIG. 10B, because no transmission process is performed, no history information item concerning the job B is present in the print-order list 131. As illustrated in FIG. 10C, regarding the checking results, checking results "normal" are recorded for the "job A", "job C", and "job D".

In contrast, in the operation performed in the case where a transmission process has been performed before a cancellation instruction is accepted, as illustrated in FIG. 11B, the start information item concerning the job B is recorded also in the print-order list 131. In this case, when the output-order list 111 illustrated in FIG. 11A and the print-order list 131 illustrated in FIG. 11B are compared with each other, the start information items including the individual job names are recorded in the same order. Accordingly, as illustrated in FIG. 11C, regarding the checking results, checking results "normal" are recorded for all of the "job A" to "job D". In this example of the operation, the cancellation instruction for the job B is disregarded. However, because the print order is not changed from the order in which print instructions have been provided, no problem occurs in checking of the print order. Note that making a search to determine whether a cancellation information item is recorded in the output-order list 111 even in the case where the job names included in the start information items which are comparison targets match leads to a large reduction in the processing efficiency. Accordingly, as in the present exemplary embodiment, no process is performed for a cancellation instruction so that reduction in the processing efficiency may be suppressed.

Figure 12A:
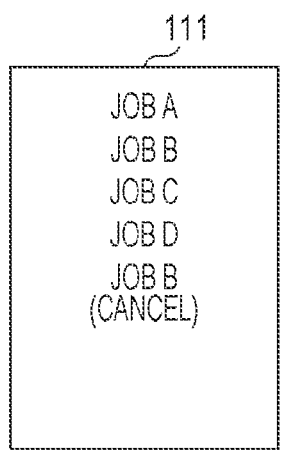
FIGS. 12A to 12C are diagrams illustrating an example of checking performed by the checking unit in the case where a cancellation instruction is provided and where an abnormality in a print order occurs.
Figure 12B:
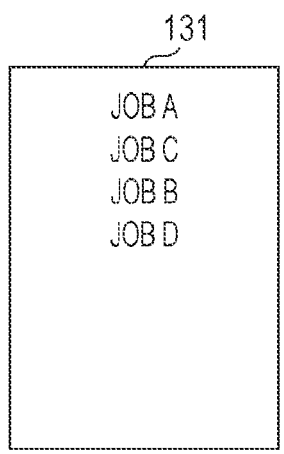
Figure 12C:
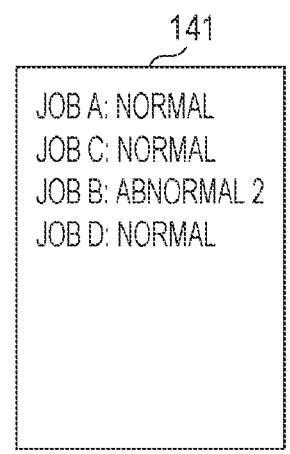

FIGS. 12A to 12C are diagrams illustrating an example of checking performed by the checking unit 140 in the case where a cancellation instruction is provided and where an abnormality in a print order occurs.

In the example illustrated in FIGS. 12A to 12C, as in FIGS. 10A to 10C and FIGS. 11A to 11C, checking results obtained in the case where print instructions for four print jobs A to D are provided and where, after that, a cancellation instruction for the print job B is provided are illustrated. FIGS. 12A to 12C illustrate a case where a transmission process has been performed before a cancellation instruction is accepted, and where the order of transmission processes is different from the order of output processes. Note that an output-order list 111 and a print-order list 131 illustrated in FIGS. 12A and 12B indicate states in which only a start information item or a cancellation information item included in each history information item is arranged (the cancellation information item being explicitly indicated).

In the case where a transmission process has been performed before a cancellation instruction is accepted and where the order of transmission processes is different from the order of output processes, an operation is performed, in accordance with the flowchart illustrated in FIGS. 8A and 8B, as follows.

First, the "job A" included in the top row of the output-order list 111 illustrated in FIG. 12A and the "job A" included in the top row of the print-order list 131 illustrated in FIG. 12B are compared with each other as target information items. As shown in a history file 141 illustrated in FIG. 12C, a checking result "normal" is recorded for the "job A".

Next, the target information items of the individual lists are updated, and the "job B" of the output-order list 111 and the "job C" of the print-order list 131 are compared with each other. Here, because a cancellation information item concerning the job B is recorded in the output-order list 111, the cancellation information item concerning the job B is recorded in a cancellation-instruction list (not illustrated). The target information item of the output-order list 111 is updated. Then, the "job C" of the output-order list 111 and the "job C" of the print-order list 131 are compared with each other. Because the job names match, as shown in the history file 141 illustrated in FIG. 12C, a checking result "normal" is recorded for the "job C".

Next, the target information items of the individual lists are updated, and the "job D" of the output-order list 111 and the "job B" of the print-order list 131 are compared with each other. Here, no cancellation information item concerning the job D is recorded in the output-order list 111. Furthermore, at this point in time, no checking result about the job B is recorded in the history file 141. The cancellation information item concerning the job B is recorded in the cancellation-information list. Thus, in accordance with steps 809 to 818 illustrated in FIG. 8B, as shown in the history file 141 illustrated in FIG. 12C, a checking result "abnormal 2" is recorded for the "job B", and the target information item of the print-order list 131 is updated. Then, the "job D" of the output-order list 111 and the "job D" of the print-order list 131 are compared with each other. Because the job names match, as shown in the history file 141 illustrated in FIG. 12C, a checking result "normal" is recorded for the "job D".

Here, referring to the history file 141 illustrated in FIG. 12C, "job A: normal", "job C: normal", "job B: abnormal 2", and "job D: normal" are recorded as checking results. In other words, according to the recorded checking results, the normal print order in which the print jobs should have been executed is the order of the job A, the job C, and the job D. However, it is understandable that an abnormality, i.e., execution of the job B that is an extra print job is inserted between execution of the job C and execution of the job D, has occurred.

The case where the start information items concerning the job A to the job D are checked as illustrated in FIGS. 9A to 9C corresponds to a case where, although an abnormality in a print order similar to the abnormality in the print order which occurs in the example illustrated in FIGS. 12A to 12C occurs, no cancellation instruction for the job B is provided. When corresponding portions of the individual lists illustrated in FIGS. 12A to 12C and FIGS. 9A to 9C are compared with each other, in both of FIG. 9A and FIG. 12A, the start information items included in the output-order lists 111 are arranged in the order of the start information items concerning the "job A", the "job B", the "job C", and the "job D". Furthermore, in both of FIG. 9B and FIG. 12B, the start information items included in the print-order lists 131 are arranged in the order of the start information items concerning the "job A", the "job C", the "job B", and the "job D". However, regarding the history files 141 including checking results, checking results included in the history file 141 illustrated in FIG. 9C are "job A: normal", "job C: abnormal 2", "job B: normal", "job C: abnormal 1", and "job D: normal", and are different from the corresponding checking results illustrated in FIG. 12C. In other words, in the present exemplary embodiment, even when the orders of start information items included in the output-order lists 111 and the print-order lists 131 are the same, different checking results are obtained in accordance with whether a cancellation instruction is present or absent. Thus, it is possible to correctly determine the details of an abnormality in a print order.

While the present exemplary embodiment has been described, the technical scope of the present invention is not limited to the scope described in the foregoing exemplary embodiment. It is clear from the descriptions in the claims that a variety of modifications and improvements may be made to the foregoing exemplary embodiment and such modifications and improvements may also fall within the technical scope of the present invention.

For example, in the foregoing exemplary embodiment, as illustrated in FIG. 1, a system configuration is used, in which the print server 100 and the image forming apparatus 200 are connected to each other so as to transmit/receive data to/from each other, and in which print instructions and so forth are transmitted from the host server 300 to the print server 100 via a network. The system configuration is not limited thereto. For example, a configuration in which an image forming apparatus having the function of the print server 100 is included may be used. Print instructions and so forth may be provided, without being provided via the host server 300, from a terminal apparatus (a personal computer or the like) that is directly connected to the print server 100.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A print control apparatus comprising:
    a print management unit that accepts print instructions for output data, and that records an order in which the print instructions have been accepted;
    a storage unit that temporarily stores the output data related to the print instructions accepted by the print management unit;
    a print control unit that sequentially acquires the output data from the storage unit, that transmits the output data to an image forming apparatus, and that records an order in which the output data have been transmitted to the image forming apparatus; and
    a checking unit that compares and checks the order in which the print instructions have been accepted, which has been recorded by the print management unit, and the order in which the output data have been transmitted to the image forming apparatus, which has been recorded by the print control unit.

2. The print control apparatus according to claim 1, wherein the checking unit determines, using a record of the order in which the print instructions have been accepted, which has been recorded by the print management unit, and a record of the order in which the output data have been transmitted, which has been recorded by the print control unit, for a portion of the order in which the print instructions have been accepted and a portion of the order in which the output data have been transmitted that are portions which match, that print processes have been performed in a normal order, and determines, for portions of the orders that are portions which do not match, that print processes have been performed in an abnormal order.

3. The print control apparatus according to claim 2, wherein, in a case where the checking unit acquires an information item indicating that a cancellation instruction to cancel a print process based on a print instruction among the print instructions has been provided, the checking unit determines, for a portion of the order in which the print instructions have been accepted and a portion of the order in which the output data have been transmitted that are portions which do not match due to cancellation of the print process using the cancellation instruction, that print processes have been performed in a normal order.

4. The print control apparatus according to claim 1, wherein
    the print management unit generates a first list in which the order in which the print instructions have been accepted is recorded, and, in a case where the print management unit accepts a cancellation instruction to cancel a print process based on a print instruction among the print instructions, the print management unit records, in the first list, a fact that the cancellation instruction has been accepted,
    the print control unit generates a second list in which the order in which the output data have been transmitted is recorded, and
    the checking unit checks an order of print processes in such a manner as to compare the first list, which has been generated by the print management unit, and the second list, which has been generated by the print control unit.

5. The print control apparatus according to claim 2, wherein
    the print management unit generates a first list in which the order in which the print instructions have been accepted is recorded, and, in a case where the print management unit accepts a cancellation instruction to cancel a print process based on a print instruction among the print instructions, the print management unit records, in the first list, a fact that the cancellation instruction has been accepted,
    the print control unit generates a second list in which the order in which the output data have been transmitted is recorded, and
    the checking unit checks an order of print processes in such a manner as to compare the first list, which has been generated by the print management unit, and the second list, which has been generated by the print control unit.

6. The print control apparatus according to claim 3, wherein
    the print management unit generates a first list in which the order in which the print instructions have been accepted is recorded, and, in a case where the print management unit accepts a cancellation instruction to cancel a print process based on a print instruction among the print instructions, the print management unit records, in the first list, a fact that the cancellation instruction has been accepted,
    the print control unit generates a second list in which the order in which the output data have been transmitted is recorded, and
    the checking unit checks an order of print processes in such a manner as to compare the first list, which has been generated by the print management unit, and the second list, which has been generated by the print control unit.

7. An image forming system comprising:
    an image forming mechanism that forms an image on a recording medium using output data;
    a print management unit that accepts print instructions for output data, and that records an order in which the print instructions have been accepted;
    a storage unit that temporarily stores the output data related to the print instructions accepted by the print management unit;
    a print control unit that sequentially acquires the output data from the storage unit, that transmits the output data to the image forming mechanism, and that records an order in which the output data have been transmitted; and
    a checking unit that compares and checks a record of the order in which the print instructions have been accepted, which has been recorded by the print management unit, and a record of the order in which the output data have been transmitted, which has been recorded by the print control unit, that determines, for portions of the orders that are portions which match, that print processes have been performed in a normal order in the image forming mechanism, and that determines, for portions of the orders that are portions which do not match, that print processes have been performed in an abnormal order in the image forming mechanism.

8. The image forming system according to claim 7, wherein, in a case where the checking unit acquires an information item indicating that a cancellation instruction to cancel a print process based on a print instruction among the print instructions has been provided, the checking unit determines, for a portion of the order in which the print instructions have been accepted and a portion of the order in which the output data have been transmitted that are portions which do not match due to cancellation of the print process using the cancellation instruction, that print processes have been performed in a normal order.

9. A non-transitory computer-readable medium storing a program causing a computer to execute a process, the process comprising:
   accepting print instructions for output data, and recording an order in which the print instructions have been accepted;
   temporarily storing, in a storage unit, the output data related to the accepted print instructions;
   sequentially acquiring the output data from the storage unit, transmitting the output data to an image forming apparatus, and recording an order in which the output data have been transmitted; and
   comparing and checking a record of the order in which the print instructions have been accepted, which has been recorded, and a record of the order in which the output data have been transmitted, which has been recorded, determining, for portions of the orders that are portions which match, that print processes have been performed in a normal order in the image forming apparatus, and determining, for portions of the orders that are portions which do not match, that print processes have been performed in an abnormal order in the image forming apparatus.

10. The non-transitory computer-readable medium according to claim 9, in the comparing and checking, in a case where an information item indicating that a cancellation instruction to cancel a print process based on a print instruction among the print instructions has been provided is acquired, it is determined, for a portion of the order in which the print instructions have been accepted and a portion of the order in which the output data have been transmitted that are portions which do not match due to cancellation of the print process using the cancellation instruction, that print processes have been performed in a normal order.

11. The print control apparatus according to claim 1, wherein the checking unit is configured to determine that print processes have been performed in a normal order in response to determining that the order in which the print instructions have been accepted matches the order in which the output data have been transmitted, and
   wherein the checking unit is configured to determine that print processes have been performed in an abnormal order in response to determining that the order in which the print instructions have been accepted does not match the order in which the output data have been transmitted.

* * * * *